DIGITAL LEVER SWITCH WITH INDICATING MEANS

Filed Nov. 21, 1961 3 Sheets-Sheet 1

INVENTORS.
Abraham Savitzky
Rudolph Losch
Stanley Szamatulski
BY
Daniel R. Levinson
ATTORNEY.

DIGITAL LEVER SWITCH WITH INDICATING MEANS

Filed Nov. 21, 1961 3 Sheets-Sheet 2

INVENTORS.
Abraham Savitzky
Rudolph Losch
Stanley Szamatulski
BY Daniel R. Levinson
ATTORNEY.

DIGITAL LEVER SWITCH WITH INDICATING MEANS

Filed Nov. 21, 1961 3 Sheets-Sheet 3

INVENTORS.
Abraham Savitzky
Rudolph Losch
Stanley Szamatulski
BY Daniel R. Levinson
ATTORNEY.

3,193,629
Patented July 6, 1965

3,193,629

DIGITAL LEVER SWITCH WITH INDICATING MEANS

Rudolf Losch, Fairfield, Stanley M. Szamatulski, Bridgeport, and Abraham Savitzky, Norwalk, Conn., assignors to The Perkin-Elmer Corporation, Norwalk, Conn., a corporation of New York Filed Nov. 21, 1961, Ser. No. 153,904
5 Claims. (Cl. 200—11)

This invention relates to a multi-pole, multiple position electrical switch. More specifically, the invention is embodied in a switch composed of a pivoted switch arm, carrying a series of contacts along the arm, and a series of terminals on a stationary circuit board, arranged along various arcs concentric with the pivot of the switch arm and so positioned that movement of the switch arm to various radial positions along these arcs will cause the contacts to close selective members of these various terminals so that the switch may make and break a plurality of circuits each time it is moved from one of its positions to another.

In one specific embodiment herein disclosed, each of the plurality of circuits represents one of the binary unit values of a number from 1 thru 9, so that the switch is useful for providing an input to computers, card or tape punchers, or other electrical or electronic apparatus which utilizes binary coded decimal data. A specific embodiment of the switch may comprise a switch arm and four series of radial circuit terminals so positioned that contacts on the switch arm may selectively close any of the four circuits at various positions of the switch arm. The first of these circuits represents the one-unit binary code input, the second represents the two-unit binary code input, the third circuit represents the four-unit binary code input, and the fourth circuit represents the eight-unit binary code input. By arranging the four sets of terminals in a specific pattern, the various positions of the switch arm may close circuits representative of any of the numerals 1 through 9, or, by closing no circuit, zero.

Prior to the invention, the only practical and readily available switches which would perform the functions intended for the switch of the invention were of a rotary type. One such switch is composed of a series of wiper arms and contacts, the wiper arms being mounted on a shaft, which is driven by a knob at one end thereof. Such a rotary switch has a number of disadvantages. First, such a switch is difficult to introduce into a circuit, requiring the soldering or other manual connection of the various contacts to the apparatus upon which it is used, thereby negativing the use of interchangeable switches for various applications. Secondly, the knob requires a comparatively large area on the control panel of the apparatus so that when a series of such knobs is utilized in, for example, a binary coded decimal input, the control panel may become quite large. Thirdly, the twist of the wrist motion which is required to set each of a group of such switches may become both tedious and quite uncomfortable for the operator, particularly when switching is required from one extreme through the entire range to the other end of the switch range.

Because of the disadvantages of the knob type rotary switch, another type of rotary switch has also been utilized previously. This switch utilizes a disc as the manually operable member, which disc is partially set into the control panel so that only a certain part of the edge protrudes through the control panel and is reachable by the finger of the operator. In order to move such a disc from one extreme position to the other, it is normally required to push the disc more than once, thus requiring the operator to make multiple movements of the fingers in going from, say, one to nine. Additionally, the same difficulty of installation and interchange of such switches in an apparatus is encountered as with the knob type rotary switch.

The present invention, which utilizes a pivoted lever as a switching member, not only avoids the difficulties of both of these prior art switches but additionally provides new and unobvious advantages over even the better features of each of them. First, the use of a lever allows movement from any position of the switch to any other by means of a single linear motion of the operator's finger. Secondly, because a plurality of these switches occupy comparatively little panel space, a relatively large number of the switches may be utilized in a comparatively small control console. Thirdly, these switches, because of the ease of introduction into control panels, may be interchanged whenever a different type of control switching arrangement may be desired by a simple replacement of the entire switch without any soldering or other mechanical operations being required, as will more fully appear hereinafter. Fourthly, the switch of the invention may be manufactured comparatively inexpensively and may be produced at very small cost in large quantities because of the adaptation of the switch to printed circuit techniques.

An object of the invention is therefore the provision of a switch which may be moved from one extreme position to the other or to any position therebetween by a simple linear motion.

Another object of the invention is the provision of a switch which is compact and requires little panel space.

A further object of the invention is the provision of a switch which is readily interchangeable.

Another object of the invention is the provision of a switch which is inexpensive to manufacture.

A further object of the invention is the provision of a switch which may be readily manufactured in an assortment of terminal and contact-closing arrangements without requiring the manufacture of many different parts for each such combination.

Further objects and advantages of the invention will become obvious to one skilled in the art upon becoming familiar with the three embodiments thereof, described in the following specification and shown in the accompanying drawing, in which.

Figure 1:
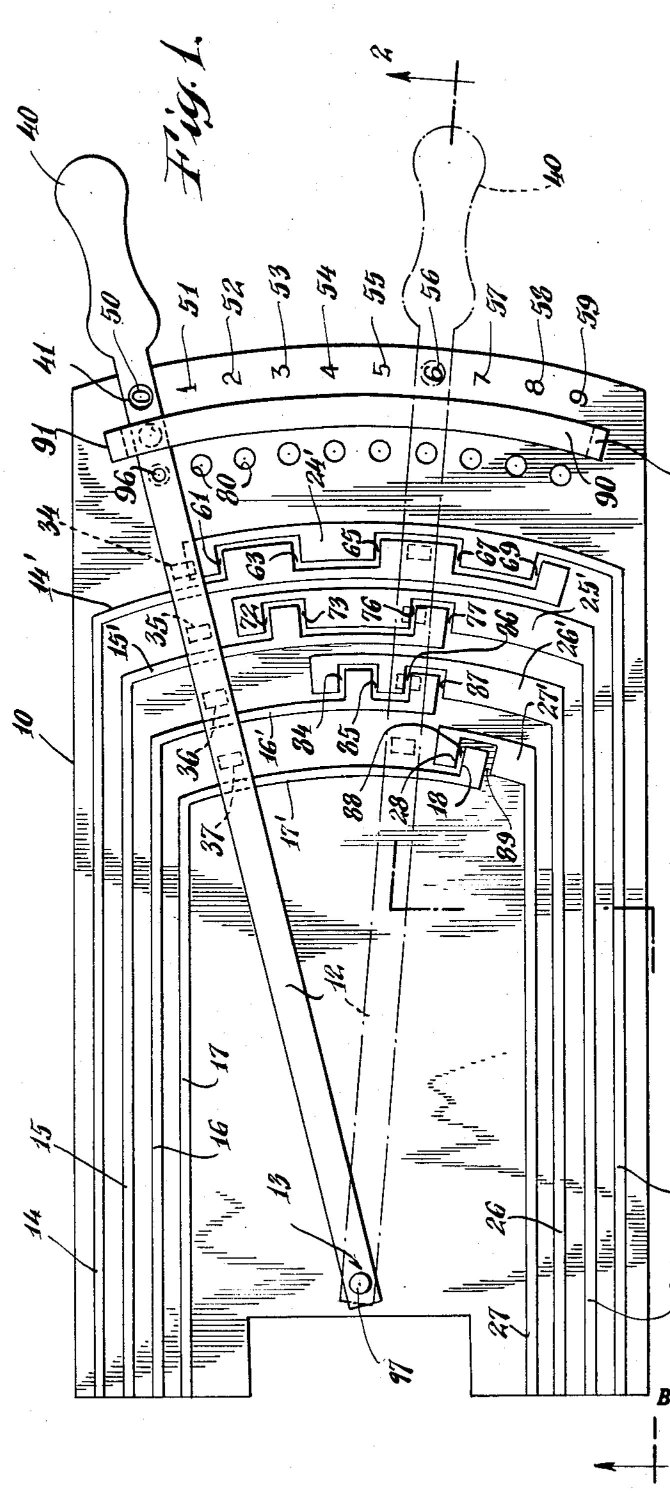
FIG. 1 is a side view of one embodiment of the switch.
Figure 2:
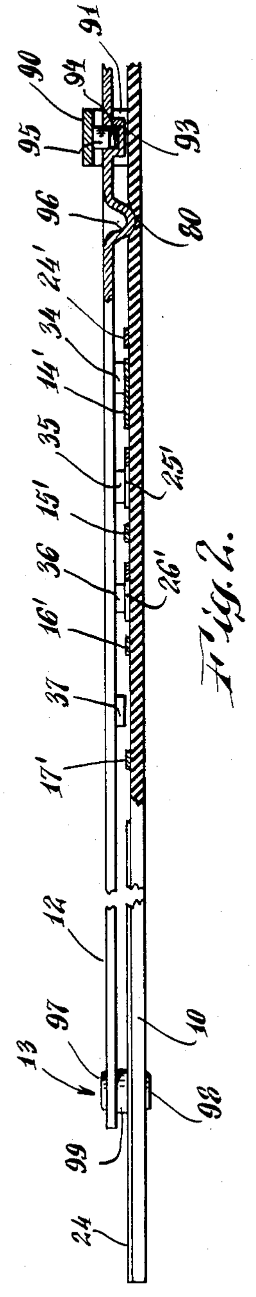
FIG. 2 is a cross-sectional view of this embodiment of the switch taken on the line 2—2 in FIG. 1.

In the first embodiment, shown in FIGS. 1 and 2, the switch is composed of the terminal board 10 and movable switch arm 12, pivotably mounted thereon at 13. The left half of one side terminal board has printed thereon two series of four conducting strips. Thus, at the top of the terminal board are a first series or set of conducting strips 14, 15, 16 and 17, and at the bottom are printed a second set or series of conducting strips 24, 25, 26, and 27. Each of these conducting strips terminates at the right into concentrically arranged arcuate conducting strips. For example, the two conducting strips which are on the out-side of the terminal board (namely 14 and 24) terminate, respectively, in arcuate conducting strips 14′ and 24′. Similarly, the innermost conducting strips 17 and 27 terminate in arcuate conducting strips 17′ and 27′ respectively; and each of the two remaining pairs of conducting strips 15, 25 and 16, 26 terminates in similar arcuate strips 15′, 25′, 16′, and 26′, respectively. As is readily seen in FIG. 1, each of these arcuate strips are interdigitated or interlocked with the arcuate strip with which it is paired for the purpose of saving space in the radial direction on the terminal board. Further, this interdigitation causes the radial portions forming these interlinking parts of the arcuate strips to lie closely adjacent to each other. For example, radial portion 18 of the arcuate strip 17′ lies closely adjacent to radial portion 28 of arcuate strip 27′. Therefore, in order to complete a circuit between contacting strip 17 and contacting strip 27, all that is required is to bridge the narrow gap between radial portions 18 and 28. As can be readily seen in FIG. 1, a plurality of such potential contacting points is present in each of the pairs of arcuate strips.

The means utilized for bridging such potential circuit points as 18 and 28 are a plurality of metallic circuit closing contacts 34, 35, 36, and 37 carried on the underside of switch lever 12. If the material of switch arm 12 is electrically conducting, these contacts, which may comprise rectangular pieces of electrically conducting metal attached to the bottom of the arm, should be electrically insulated from the body of said arm. Contact 37, when present immediately above radial portions 18 and 28, will electrically bridge the same so as to connect electrically arcuate strips 17′ and 27′ and therefor conducting strips 17 and 27 to each other, thereby forming a circuit. Similarly, bridging contacts 34, 35, 36, will, at various positions of the switch arm 12, bridge adjacent radial portions of, respectively, radial strips 14′ and 24′, 15′ and 25′, and 16′ and 26′. Since the potential bridging point formed by the adjacent radial portions of the various pairs of the arcuate strips are at different positions for each of such pairs, different ones of the various potential circuits are closed at different positions of switch arm 12. For example, with the switch arm in the position shown in solid lines in FIG. 1, none of the radial portions of any of the pairs of arcuate strips are closed by the contacts 34, 35, 36, or 37. On the other hand, when the switch arm is in the position shown in broken lines in FIG. 1, contacts 35 and 36 will bridge radial portions of strips 15′ and 25′ and of 16′ and 26′, respectively (namely, at points 76 and 86, respectively, as will be hereinafter described). The positioning of the various potential bridging points (i.e., adjacent radial portions), though apparently random to casual observation, are actually positioned on the circuit board 10 in a specific predetermined relationship so as to yield a read-out for the various positions of the switch in a binary coded decimal format.

In order to recognize this binary code read-out function, one should first be apprised of the fact that the potential circuit between strip 14 and 24 is assigned a one-unit value; the potential circuit between strips 15 and 25 is the two-unit; the potential circuit between strip 16 and 26 is the four-unit; and the potential circuit between strip 17 and 27 is the eight-unit output of this switching circuit. Thus, movement of the switch arm 12 by means of the handle 40 to the position where the indexing aperture 41 in the switch arm 12 is positioned over the indexing numeral 1 (referenced 51 in the drawing) will move contact 34 so as to bridge the uppermost pair 61 of radial portions of arcuate strips 14′ and 24′, thus completing the one-unit circuit. It should be noted that in this position none of the bridging contacts 35, 36, or 37 complete any other circuits. Further, pivoting of the lever so that index aperture 41 overlies the numeral 2 (referenced 52) will move contact 34 onto that portion of arcuate strip 14′ which lies between radial portion point 61 and radial portion point 63 so that this contact 34 completes no circuit. At the same time, bridging contact 35 will be moved to the position 72, so as to bridge the uppermost radial portions of arcuate strips 15′ and 25′ thereat. The circuit between conducting strip 15 and 25 will be completed, and since this is the two-unit circuit, the output of the switch would represent the numerical value two. When the switch lever is moved downward so that the aperture 41 overlies the numeral 3 (referenced 53), contact 34 will be positioned so as to bridge the radial portions at 63 of arcuate strip 14′ and 24′, and bridging contact 35 will complete a circuit through arcuate strips 15′ and 25′ by bridging the radial portions at 73. Thus, both the one-unit and two-unit circuits will be completed so as to represent the numerical value three. Movement of the lever arm to the position so that the indexing aperture 41 overlies the numeral 4 (referenced 54) will cause contact 36 to overlie the radial portions of arcuate strip 16′ and 26′ at the point 84, while both contact 34 and contact 35 will not bridge any radial portions on their corresponding arcuate strips. In this position the four-unit circuit through conducting strips 16 and 26 will be completed, but both of the two-unit and one-unit circuits will be open, so that the output of the switch will have the numerical value of four. Movement of the switch to the next position, with the numeral 5 (referenced 55) underlying aperture 41, will cause contact 36 to bridge the radial portions at 85, while contact 34 will bridge the radial portions at 65; thus, the four-unit and one-unit circuits will be closed so as to represent the value of five. Movement of the switch arm to the broken line position shown in FIG. 1 with the aperture 41 over the numeral 6 (referenced 56) will position contacts 36 and 35 over radial portions 86 and 76, respectively, so as to close the four and two-units circuits, thereby representing the numerical value six. Movement of the arm to the next position so that the numeral 7 (referenced 57) will show through aperture 41 will cause contact 35 to overlie the radial portions at 67, contact 35 to close the radial portions at 77, and contact 36 to overlie the radial portions at 87. Thus, all three of the four, two, and one-unit circuits will be closed so that the output of the switch will have the numerical value of seven. When the indexing aperture 41 overlies the numeral 8 (referenced 58), contact 37 will bridge the previously mentioned radial portions 18 and 28 (generally referenced 88) so as to complete the eight-unit circuit between conducting strips 17 and 27. It should be noted that none of contacts 34, 35 or 36 overlie a pair of radial portions of their respective arcuate strips in this position so that only the eight-unit circuit is closed; and, therefore, the numerical value of the output of the switch will be eight. Finally, when the switch arm is in its lowermost position so as to position aperture 41 over numeral 9 (referenced 59), contact 37 will overlie the radial portions at point 89 while at the same time contact 34 will overlie the radial portions of the arcuate strips (14′, 24′) associated therewith at point 69. Therefore, the closing of the eight-unit and one-unit circuits will yield an output numerical value of nine for this switch position.

In order to maintain the switch arm carried contacts 34, 35, 36, and 37 against the arcuate strips, there is provided a guiding and biasing means composed of an arcuate bridge member 90, which is supported above the surface of element 10 by end portions 91 and 92, so as to overlie the switch arm 12 as may be best seen in FIG. 2. The part of the switch arm underlying this bridge member 90 is sharply indented as shown at 93 so as to form a cylindrical socket for spring 94, which in turn supports a small tubular member 95 under tension so as to press against the bottom of bridge member 90. This mechanism therefore presses switch arm 12 downwardly as shown in FIG. 2 so as to maintain an integral detent projection 96, pressed from the material of the switch arm, into a series of detent receiving depressions 80 in terminal board 10. These detent receiving depressions in element 10 are radially aligned with the 0 (referenced 50) and the various numerals 1 through 9 (referenced 51 through 59) so as to yield a click stop detent mechanism for assisting in maintaining the arm at one of the positions corresponding to the various numerals mentioned. The pivot 13 for the switch arm 10 may comprise any conventional means such as screw 97, nut 98 and spacer washer 99 as best seen in FIG. 2.

Although in the embodiment of FIGS. 1 and 2, as shown and previously described, both the numerals for indicating the position of the switch arm and the detent means are on the side of the terminal board 10, both of these or either one may be on the edge (i.e., righthand side in FIG. 1) of this terminal board. In fact, in most applications, it will probably be preferable to have the numerals printed on the edge of the board. When the numerals are so placed, a simple pointer or the like may be provided on the face of switch arm 12 to act as the indexing means.

The embodiment shown in FIGS. 3 through 7 differs from the previous embodiment primarily in utilizing a different numeral indexing means and a different detent means. Specifically, the FIGS. 3 through 7 embodiment utilizes a numeral indexing means which presents the numeral representing the position of the switch arm at the same position. The reason for this type of indexing is to allow a series of switches in a control panel to be so positioned that the operator may read the numerical values of each of the switches in a straight line. That is, when a series of switches of the second embodiment are utilized in a horizontal linear array, the numerical values of each of these switches will be presented in a single horizontal line so that the operator may read the combined output of these switches as a single number, without necessitating any movement of the eyes or mental reorientation of the various numbers read.

Figure 6:
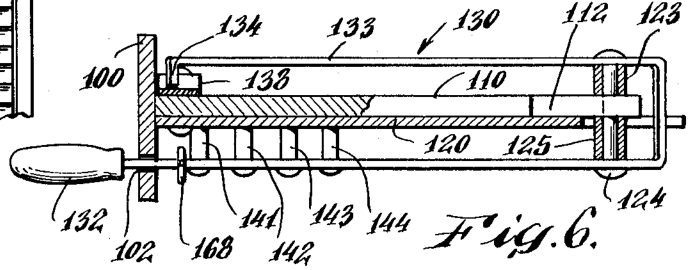
FIG. 6 is a horizontal section, taken on the line 6—6 in FIG. 3.
Figure 4:
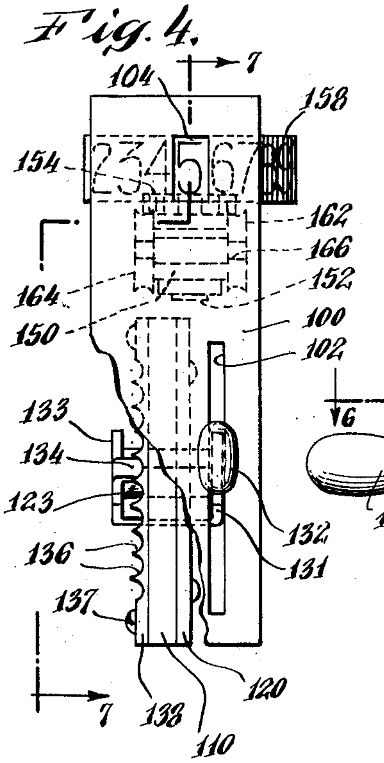
FIG. 4 is a front elevation of this second embodiment, with part of the front plate broken away.
Figure 3:
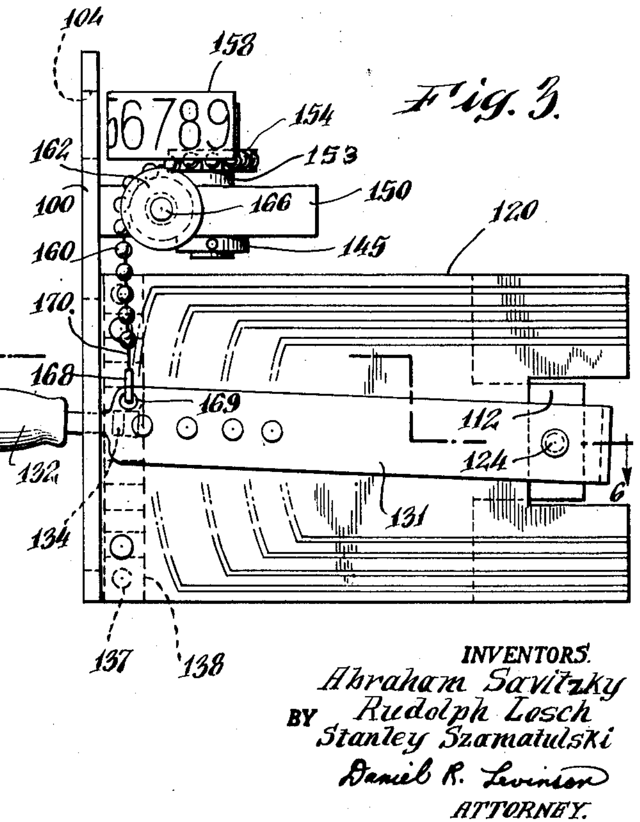
FIG. 3 is a side view of a second embodiment of the switch.

The second embodiment comprises a front plate element 100, which has rigidly attached thereto (see FIG. 6) main supporting vertical plate 110. This supporting plate 110 has attached to one face thereof a terminal board 120, which may be substantially identical to the terminal board shown in FIGS. 1 and 2 and referenced by the numeral 10 therein; in fact, boards 120 and 10 may be identical and interchangeable. This terminal board 120 may have printed thereon the same two sets of conducting strips and arcuate interdigitated portions as does the terminal board in FIGS. 1 and 2. For this reason these elements will not be described again. Preferably the terminal board 120 is attached to the main support plate 110 in such a manner as to be removable therefrom so that different terminal boards may be placed on this plate. Main support plate 110 has a reduced right-hand end 112 (as best seen in FIG. 3) which supports, by means of a pivot pin 124 and spacing washers 123 and 125, a U-shaped switching member 130. One end of one arm 131 of this U-shaped member carries handle 132 while the end of the other arm 133 is bent to form detent tongue 134 as seen in FIGS. 4 and 6. This detent tongue cooperates with the detent depressions 136 formed in a plate 138 which is attached to the main support plate 110 by any conventional means such as screws 137. In this embodiment of the invention, the natural resiliency of the material of the arm 130 tends to hold tongue 134 in depressing 136, but additional means, such as shown 90, 94, 95 in FIG. 2, may be also utilized for this purpose. The arm 131 of the U-shaped switching member, which is adjacent terminal board 120, carries electrically conducting contact members 141, 142, 143, and 144, which function in substantially the same way as the contacts 34 through 37 of the FIGS. 1 and 2 embodiment. If switch member 130 is electrically conducting, each of contacts 141–144 should be electrically insulated from this member.

Mounted above the main supporting plate 110 is the indicating mechanism supporting block 150. In this mounting block 150 is provided a vertical bore for revolvably supporting vertical shaft 152. Friction reducing means, such as ball bearings, may be provided between the walls of this vertical bore and shaft 152. Rigidly mounted on this shaft are sprocket 154 and thereabove indicator wheel 156, the latter by means of set screw 151. Loosely mounted on shaft 152 between the upper surface of block 150 and the lower surface of sprocket 154 is locating or spacing collar 153. This collar, maintains the shaft, sprocket, and indicator wheel at the proper height without creating any appreciable frictional resistance to rotation of this assembly. A locking ring 145 is attached to the lower end of shaft 152 by any suitable means, such as taper pin 146, in order to retain this end of shaft from escaping from the block when the switch is in a position other than upright.

Figure 7:
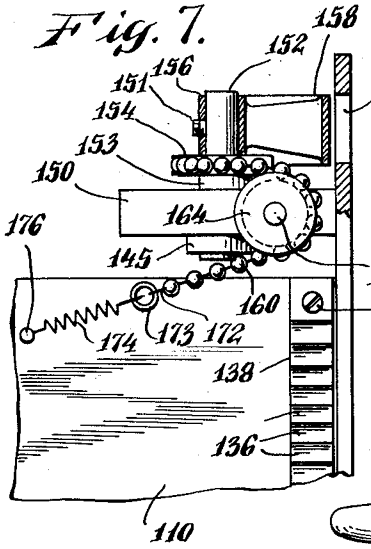
FIG. 7 is a part vertical sectional, part side elevation, taken generally along the line 7—7 in FIG. 4.
Figure 5:
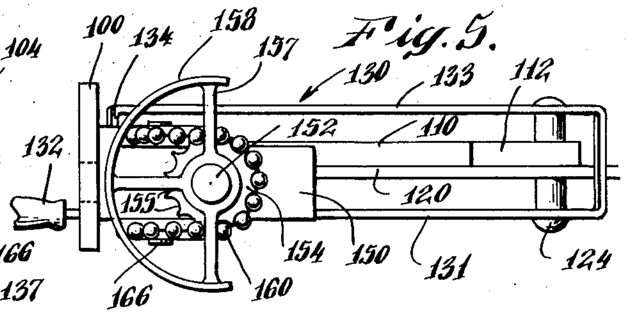
FIG. 5 is a plan view of this second embodiment.

The indicator wheel 156 comprises a cylindrical rim 158, which is supported from the central hub by means of spokes 157. The outer surface of this cylindrical rim 158 has imprinted thereon, in any suitable manner, the numerals 0 through 9 as is best seen in FIGS. 3 and 4. Sprocket wheel 154 has teeth 155 (as best seen in FIG. 5), between which are indentations receiving the individual balls of a ball chain 160. The ends of the ball chain 160 which leave the sprocket 154 are supported by pulleys 162 and 164 (see FIGS. 3, 4 and 7). These pulleys are revolvably mounted on opposite ends of bearing shaft 166, which is mounted in a horizontal bore in mounting block 150. One end 170 of the ball chain is connected to the arm 131 of the switching member 130 which bears the handle 132. Specifically, this end 170 of the chain terminates in a link 168 which passes through an aperture 169 in switch arm 131. The other end 172 of this ball chain is attached by link 173 to a spring 174, which in turn is attached by suitable means such as screw or rivet 176, to main supporting plate 110 as best shown in FIG. 7. The spring 174 maintains tension on the entire ball chain so that sprocket 154 is biased in a given direction, but is held against movement in this direction by the length of the chain between switch arm 131 and the other side of the sprocket 154. It is thus this length which determines the position of sprocket 154 and, therefore, the position of indicator wheel 156 while the spring acts to eliminate any backlash in this sprocket drive.

An alternative arrangement would be for end 172 of the ball chain to be longer so as to reach around a pulley more or less at the bottom of main supporting plate 110 and then be attached to the lower edge of arm 133 of the switching member 130, utilizing means similar to elements 168 and 169 used for attaching the other end 170 of the chain to switch arm 131. With this arrangement, movement of switching member 130 up or down would likewise drive the sprocket, but since the length of the ball chain may remain constant and the sprocket would be positively driven in both directions, no spring is required. However, a small tension spring could be provided in any appropriate part of the chain in order to avoid any looseness in the chain which could cause backlash error.

In order to allow movement of the switch member 130, an elongated aperture 102 is provided in front plate 100 so as to allow the arm 131 of the switching member to protrude therethrough. It is to this protruding part that the handle 132 is attached. Similarly, so as to allow the reading of the numerals on the indicator wheel 156, an aperture 104 is provided in the front plate 100 (as best seen in FIGS. 3, 4, and 7).

The operation of the embodiment shown in FIGS. 3 through 7 is as follows. Movement of the handle 132 and therefore of the switch member 130 up or down will cause detent tongue 134 to be forced out of curved detent depression 136 so as to yield a click stop type of positioning means, thereby insuring that the switching member 130 is positioned in one of the ten positions which will cause contacts 141 through 144 to close the various circuits between selective pairs of conductors in the first and second sets on circuit board 120. At the same time this motion of the switching member will move one end 170 of the ball chain 160 in the same direction thereby to rotate the sprocket 154 and thus to rotate the indicator wheel 156 which is rigidly attached to shaft 152. Therefore, the numeral representative of the switching member position will be located behind aperture 104, so that the operator will be able to read this position as the numerical value of the circuit closed by the switching member in its present position. Since the indexing means (i.e., the numeral showing in 104) remains in the same position at all times, a series of the switches may be arranged in a horizontal row so as to make the total output of all the switches read across as a regular decimal number. That is, if one were to place another switch of the same type to the right of the one shown in FIG. 4, the numeral value of each switch would then appear on the same horizontal line and in the same relative position as the numerals of a two-digit conventional Arabic numeral. For example, if the left-hand switch were to show the numeral 5 while the right hand switch were to have the numeral 7, the output of the two switches would then represent the Arabic numeral 57. Thus, the left-hand switch would be connected to the tens column of a computer, tape punch, or other numerical data handling apparatus; and the right hand unit would be connected to the unit column, so that two switches could put into this computer or other apparatus any numerical value from 1 to 99. Similarly, a whole series of switches could be provided in a horizontal row, and the advantage of linear read-out to the operator would remain because the second embodiment of the switch as shown in FIGS. 3 through 7 has the advantage of producing an indication of the numerical value thereof in a single position regardless of the position of the switch member.

The embodiment of FIGS. 3–7 is only illustrative of one manner of providing an indexing means which always presents the numeral indicative of switch position at the same point so as to allow linear readout of an array of such switches; and other means may be utilized for providing such indexing. For example, an indicia-bearing arcuate strip may be carried by the switch arm in such manner that the index numeral representative of arm position will be readable in a window (similar to the one shown at 104 in FIGS. 3–7). Such an arcuate strip may be attached to the switch arm at a point near 169 (see FIG. 3) and be concentric to the pivot axis of the arm so as to extend generally upwardly and to the right as viewed in FIG. 3. The numerals would then be printed on the left side (as viewed in FIG. 3) of the strip so that the particular numeral representing the arm position is observable through the window. Since the numerals on the arcuate strip may be no higher than the distance between two adjacent switch positions (as projected on the arcuate strip), window 104 may be replaced by a magnifying lens in order to increase the apparent size of the index numeral therebehind. Alternatively, the strip may be transparent with opaque numerals (or opaque with transparent numerals), and a light may be placed therebehind to project the numerals onto window 104. In this latter case, the window would preferably comprise a piece of frosted glass, a Fresnel field lens, or the like, in order to assist the observation of this projected image. By choosing the proper placement of the light source and utilizing additional optical elements, the apparent size of the index numerals may be made considerably greater than their actual size on the arcuate strip.

Figure 8:
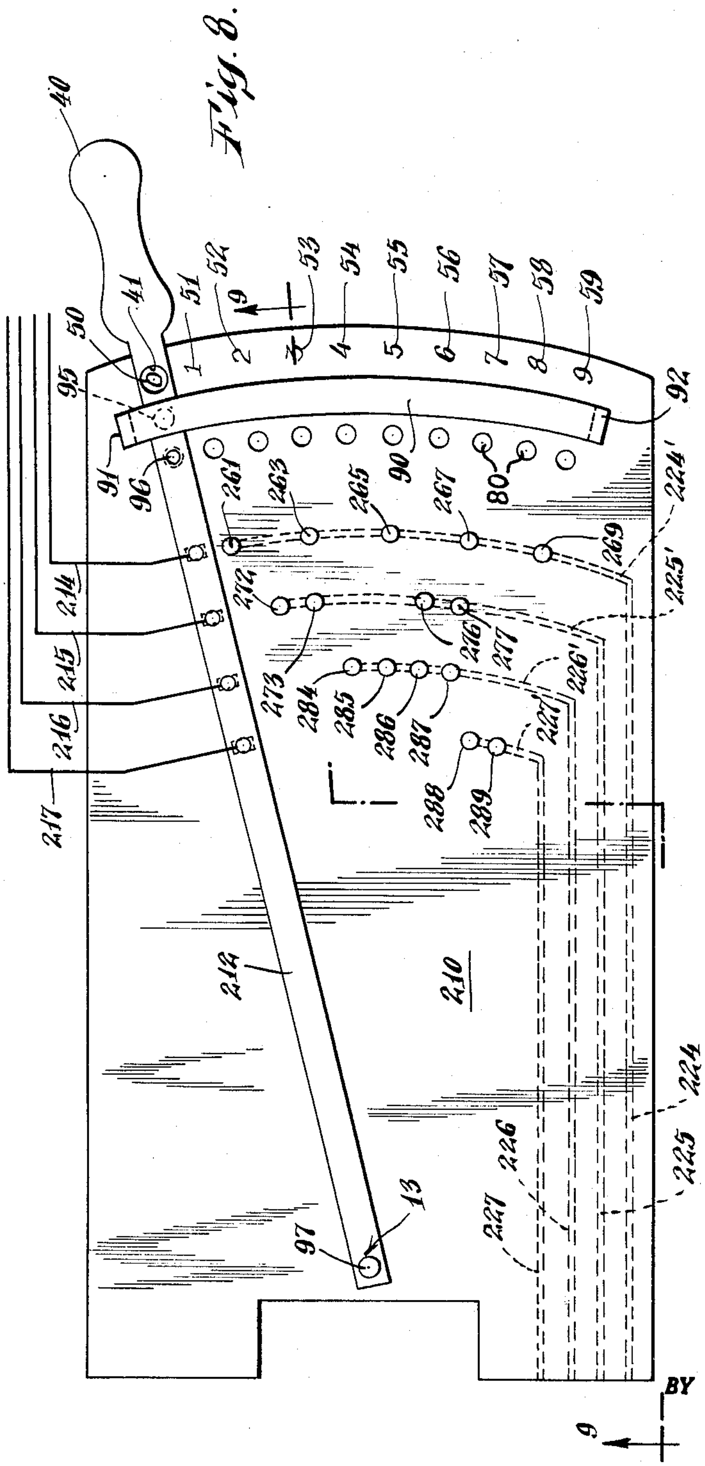
FIG. 8 is a side view of a third embodiment of the invention.
Figure 9:
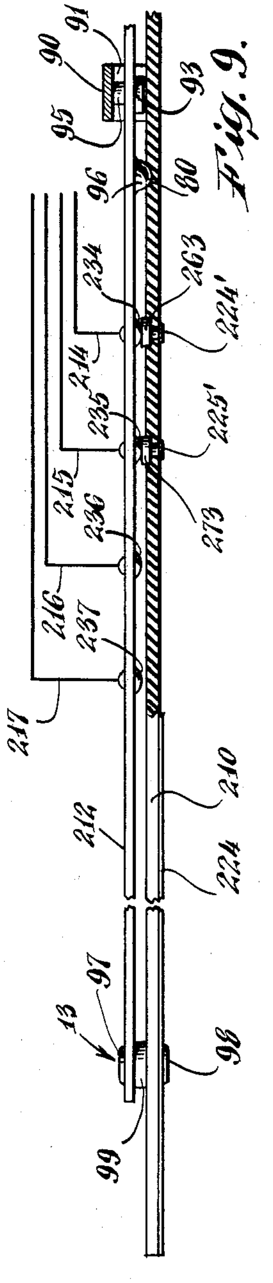
FIG. 9 is a cross-sectional view of this third embodiment, taken generally on the line 9—9 in FIG. 8.

The third embodiment of FIGS. 8 and 9 is a form which is generally similar to the simpler embodiment of FIGS. 1 and 2, but is even less complicated structurally. Since many of the parts of this third embodiment are interchangeable with that of FIGS. 1 and 2, like numerals are utilized for these identical parts. The main circuit board 210 of FIGS. 8 and 9 may be composed of the same material, of the same shape and be modified in the same way (except for the printed circuit elements thereon) as terminal board 10 of FIGS. 1 and 2. Similarly arm 212 in FIGS. 8 and 9 may be identical to arm 12 in all of its structural aspects except for the associated electrical contacts thereon, as described below. Thus, detent receiving depressions 80 formed in the board are identical to the similarly referenced elements in FIGS. 1 and 2. Similarly the index numerals from 0 through 9 (referenced 50–59) may be identical to those in FIG. 1, as may be arcuate bridge member 90, its end portions 91 and 92, the associated elements 93–95 for biasing arm 12 toward the terminal board, and the detent projection 96 on said arm. Similarly, arm 212 may be pivoted to terminal board at 13 in the same manner and utilizing the same elements 97–99 as in the FIGS. 1 and 2 embodiment, the same handle 40 may be utilized for pivoting the arm as in FIGS. 1 and 2, and the same indexing aperture 41 is present in the arm.

Mounted on arm 212, in the same relative position as are contacts 34–37 on arm 12 in FIGS. 1 and 2, are rounded contact elements 234, 235, 236, and 237, as best seen in FIG. 9. Although substantially flat-bottomed contact elements, similar to elements 34–37 in FIGS. 1 and 2, may be utilized in the FIGS. 8 and 9 embodiment also, it is preferable to use rounded elements as will appear subsequently. These contact elements 234–237 extend through the material of arm 212 in much the same way as rivets and are connected at their upper side (as viewed in FIG. 9) to lead wires 214–217, respectively. If the switch arm is of electrically conducting material, contact elements 234–237 should be electrically insulated therefrom. In the same positions as occupied by adjacent radial portions (61, 63, 75, 67, 69, 72, 73, 76, 77, 84, 85, 86, 87, 88, and 89) in the FIGS. 1 and 2 embodiment, are positioned the terminal board contact elements 261, 263, 265, 267, 269, 272, 273, 276, 277, 284, 285, 286, 287, 288, and 289. These contact elements, as best seen with respect to elements 263 and 273 in FIG. 9, may comprise flat-topped rivet-shaped inserts of electrically conducting material set through terminal board 210. Should the terminal board be of electrically conducting material, these contact elements should be electrically insulated therefrom. As best seen in FIG. 8, the lower end of each of contacts 261, 263, 265, 267, and 269 is in contact with arcuate part 224′ of conductive strip 224. This strip, as well as conductive strips 225, 226, and 227 may be printed on the bottom side (as viewed in FIG. 8) of the terminal board 210, with the arcuate parts thereof (namely, 224′, 225′, 226′, and 227′) being in contact with the lower ends of the corresponding contact elements. Alternatively, these conductive strips which comprise a first set of conductors, analogous to those at 24–27 in FIGURE 1 may be wires, suitably connected to the lower end of the contact elements. Thus, the lower end of each of contacts 272, 273, 276, and 277 are electrically connected to arcuate part 225′ of conductive strip 225; the lower end of each of contact elements 284, 285, 286, and 287 are electrically connected to arcuate part 226′ of conductive strip 226; and the lower end of each of contact elements 288 and 289 are electrically connected to the arcuate part 227′ of conductive strip 227.

As in the FIGS. 1 and 2 embodiment (and also the FIGS. 3–7 one), movement of the arm to the various positions indexed by the numerals 1 through 9 will close various circuits between selective pairs of the first set of conductive strips 224–227 and the second set of conductors or wires 214–217. In fact, the circuit between conductive strip 224 of the first set of conductors and wire 214 of the second set of conductors has the same binary coded decimal value (namely, one) as between the corresponding conductive strips 24 and 14 of the FIGS. 1 and 2 embodiment; the circuit between strip 225 and wire 215 (of the first and second set of conductive means, respectively) corresponds to that between strips 25 and 15 (value of two); the circuit between strip 226 and wire 216 corresponds in value to that between strips 26 and 16 (four);

and the circuit between strip 227 and wire 217 has the same value (eight) as between strips 27 and 17 in the FIG. 1 embodiment. Since the terminal board contacting elements 261, 263, 272, etc. are in the same position as the potential bridging radial portions 61, 63, 72, etc. in the FIG. 1 embodiment and the arm-carried contact elements 234–237 are in the same position as the bridging contacts 34–37 in FIG. 1, exactly the same circuits of the same numerical value in binary coded decimal will be established in the various positions of switch arm 212 as for arm 12 in FIG. 1. Therefore, the description of the various circuits closed by switch arm 12 in its various positions is equally applicable to the FIGS. 8 and 9 embodiment. Therefore, this explanation will not be repeated.

Although wires 214–217 are shown as being led off to the upper side of the terminal board in FIG. 8, in practice this is not necessarily so. Thus, the wires could be led along the top of switch arm 212 toward pivot 13 and there be connected individually to conductive strips similar to those shown at 14–17 in FIG. 1. As previously mentioned, switch arm carried contact elements 234–237 may be flat-bottomed rather than rounded as shown. Thus, they would be more like elements 273 and 263 shown in FIG. 9. If they are so formed, switch arm 212 could be easily used with either the FIG. 1 or FIG. 8 terminal board without modification, such elements serving to either bridge the adjacent radial portions of the conductive strips in FIG. 1 or else contact the terminal board contacting elements of FIG. 9. If the switch arm contact elements utilized are flat, then it would be preferable for the terminal board carried contacting elements 263, 273, etc., to be rounded much in the manner of the switch arm elements 234–237 shown in FIG. 9.

All three embodiments of the invention may be manufactured relatively inexpensively and occupy a small amount of panel space. Thus, the embodiments of FIGS. 1 and 2 and of FIGS. 8 and 9 may have a horizontal depth (i.e., the left to right direction in FIGS. 1 and 8) of approximately 2½" with a height (i.e., the vertical direction in FIGS. 1 and 8) of 1½" and a thickness (i.e., the vertical direction in FIGS. 2 and 9) of considerably less than ½". However, when the index numerals are printed on the front edge (i.e., right-hand edge in FIGS. 1 and 8) the edge thickness should be approximately ½". The embodiment of FIGS. 3–7 will have somewhat larger dimensions if the same circuit board is utilized. Thus, the height (i.e., the vertical direction in FIG. 3) will be approximately 2¼"; the thickness (i.e., the vertical direction in FIG. 5) will be approximately ½", while the depth (i.e., the horizontal direction in FIGS. 3, 5, and 6) will be the same as in the FIGS. 1 and 2 and FIGS. 8 and 9 embodiments, namely, 2½".

Although the specific circuit boards illustrated are designed to yield a binary coded decimal readout, the switch may be utilized for enumerable other types of circuits. Thus, the various circuit closing positions (i.e., those shown at 61, 63, 72, 261, 263, 272, etc.) may be positioned on a circuit board so as to yield any other numerical code, for example, the Gray code. In fact, the circuit board may be designed so that the switch is capable of use with any number of circuits which may or may not represent numerical data. Thus, the switch may be utilized for closing a plurality of different circuits in various positions of the switch arm whether these circuits are logically related or not. Although only four potential circuits are illustrated on the circuit boards in FIG. 1 and FIG. 8, it is obvious that more circuits could be placed on the circuit board so as to allow a greater number of different circuit combinations than illustrated or for adding a so-called parity circuit. It is also, of course, possible to increase the number of switch positions to somewhat greater than ten. The embodiment of FIGS. 3–7 additionally provides the opportunity to utilize both sides of the main supporting plate 110 to carry circuit boards of the type shown at 120. Of course, with this modification of the second embodiment, additional contacts, similar to those shown at 141–143, should be mounted on the other arm 133 of the switch member 130. Obviously, when such an addition is made, the number of circuits which may be controlled by the switch becomes twice as great. Thus, it may be seen that the invention provides a comparatively inexpensive switch which may control a comparatively large number of circuits in any logical switching arrangement desired. Additionally, because of the possibility of utilizing different circuit boards (such as shown at 120) with the same other elements of the switch and the interchanging of parts between the various embodiments, the manufacturer may adapt the switch to many different applications without requiring the maintenance of large inventories of different parts or even the manufacture thereof. Similarly, the switches may be sold to the user with a large number of different circuit boards with a different arrangement of the contact points (i.e., 61, 261, etc.) and even different numbers of arcuate portions (i.e., 24', 224', etc.) and conductive strips (i.e., 24, 224, etc.), so that the user may interchange circuit boards and utilize the switch for a wide variety of applications. The number of contacts (such as 34–37, 141–144, and 234–237) on the switch member must of course be as large as the number of potential circuits on that circuit board which has the greatest such number, in order to make the switch member usable with all such circuit boards.

Since additional modifications and variations of the invention may occur to one skilled in the art upon reading the foregoing specification and upon seeing the accompanying drawings, the invention is not intended and should not be limited to any of the details of the specific embodiments shown and described. On the contrary, the invention is intended to be limited solely by the scope of the appended claims.

We claim:

1. An electric switch comprising a circuit board carrying at least one pair of electrically conducting means; each member of said pair including an arcuate part, said arcuate parts being substantially concentric; each arcuate part having at least one radial portion extending toward the arcuate part of the other member of said pair and being circumferentially adjacent a radial portion extending from the arcuate part of said other member; the radial edges of said adjacent portions lying closely adjacent to each other; pivot means physically connected to said circuit board; a switch arm pivotably mounted on said pivot means; at least one electrically conducting bridging means carried by said switch arm and so positioned thereon as to wipe across said adjacent radial edges upon movement of said arm; said bridging means comprising a single electrically conductive contact element having a single, continuous, substantially plane surface of sufficient dimension so as to physically and electrically bridge said edges in some position of said arm, thereby establishing a circuit through said one pair of electrically conducting means.

2. An electric switch according to claim 1, in which said switch arm comprises an elongated member mounted on said pivot means adjacent one end and having a readily seizable means at the other end, and said contact element is positioned on said arm between said pivot means and said readily seizable means.

3. An electric switch comprising a circuit board carrying at least one electrically conducting means, said conducting means being connected to at least one electrically conducting contact means on one side of said board; pivot means physically connected to said circuit board; a switch arm pivotably mounted on said pivot means in such position as to overlie said one side of said board in parallel spaced relation thereto; at least one electrically conducting contact element on said switch arm, being so positioned thereon as to wipe across said contact means on said circuit board upon movement of said switch arm so as to make physical and electrical contact therewith in at least one position of said arm, thereby establishing an electric circuit; an indicator wheel bearing indicia thereon; a sprocket wheel rigidly connected to said indicator wheel; and a chain connected to said switch arm and said sprocket wheel, so that movement of said arm moves said chain to drive said sprocket and therefore said indicator wheel, thereby indicating the position of said arm.

4. An electric switch according to claim 1, in which a plurality of pairs of electrically conducting means are provided, each arcuate part of each member of said pairs having at least one said radial portion extending adjacent to a radial portion extending from the arcuate part of the other member of the same pair; a plurality of said bridging means are provided, each comprising one said contact element; each contact element thereby completing a circuit through one of said pairs of said conducting means in some position of said switch arm.

5. An electric switch according to claim 1, in which indexing means are operatively connected to said switch arm for indicating the position thereof, whereby the operator may readily determine the exact position of said arm by simple inspection.

References Cited by the Examiner

UNITED STATES PATENTS

| | | | |
|---|---|---|---|
| 473,134 | 4/92 | Soden | 200—15 |
| 474,632 | 5/92 | Fehr | 200—15 |
| 492,761 | 2/93 | Desant | 200—167 X |
| 864,694 | 8/07 | Ross | 200—153 |
| 917,023 | 4/09 | Dorgeloh | 200—14 |
| 2,010,741 | 8/35 | Sullender | 200—11 X |
| 2,794,081 | 5/57 | Luhn | 200—14 |
| 2,853,564 | 9/58 | Gahagan. | |
| 2,896,033 | 7/59 | Hartz | 200—11 |
| 2,906,838 | 9/59 | Deighton | 200—11 X |
| 2,995,143 | 8/61 | Strathearn | 200—11 X |

ROBERT K. SCHAEFER, *Acting Primary Examiner.*

BERNARD A. GILHEANY, *Examiner.*